(12) United States Patent
Fischer et al.

(10) Patent No.: US 7,871,078 B2
(45) Date of Patent: Jan. 18, 2011

(54) PISTON RING AND METHOD FOR THE PRODUCTION THEREOF

(75) Inventors: Manfred Fischer, Leichlingen (DE); Christian Herbst-Dederichs, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 278 days.

(21) Appl. No.: 10/583,433

(22) PCT Filed: Nov. 17, 2004

(86) PCT No.: PCT/DE2004/002531

§ 371 (c)(1),
(2), (4) Date: Jun. 19, 2006

(87) PCT Pub. No.: WO2005/061751

PCT Pub. Date: Jul. 7, 2005

(65) Prior Publication Data

US 2007/0128807 A1    Jun. 7, 2007

(30) Foreign Application Priority Data

Dec. 19, 2003   (DE) ............................... 103 59 802

(51) Int. Cl.
*F16J 9/26* (2006.01)
(52) U.S. Cl. .................. 277/442; 277/443; 277/444
(58) Field of Classification Search .......... 277/442–444
See application file for complete search history.

(56) References Cited

U.S. PATENT DOCUMENTS

| | | | | |
|---|---|---|---|---|
| 2,905,512 A | * | 9/1959 | Anderson | 277/442 |
| 2,912,292 A | * | 11/1959 | Lawitschka | 277/444 |
| 3,435,502 A | * | 4/1969 | Morgan et al. | 29/888.074 |
| 3,650,537 A | * | 3/1972 | Sugahara | 277/444 |
| 3,677,558 A | * | 7/1972 | Sugahara | 277/444 |
| 3,814,447 A | * | 6/1974 | Prasse et al. | 428/663 |
| 3,944,236 A | * | 3/1976 | Takao | 277/441 |
| 4,040,637 A | * | 8/1977 | McCormick | 277/460 |
| 4,185,843 A | * | 1/1980 | Beyer et al. | 277/441 |
| 4,251,599 A | * | 2/1981 | McCormick | 428/682 |
| 4,323,257 A | * | 4/1982 | Kondo et al. | 277/441 |
| 4,835,026 A | * | 5/1989 | Horiki et al. | 428/40.6 |
| 5,091,220 A | * | 2/1992 | Horiki et al. | 427/272 |
| 5,295,696 A | * | 3/1994 | Harayama et al. | 277/443 |
| 5,405,154 A | * | 4/1995 | Tsuchiya et al. | 277/443 |
| 5,743,536 A | | 4/1998 | Komuro et al. | |
| 5,794,943 A | * | 8/1998 | Atmur et al. | 277/441 |

(Continued)

FOREIGN PATENT DOCUMENTS

EP    0 702 097 A    3/1996

(Continued)

*Primary Examiner*—Alison K Pickard
(74) *Attorney, Agent, or Firm*—Robert L. Stearns; Dickinson Wright, PLLC

(57) ABSTRACT

A piston ring includes a running surface having a running surface profile, and an upper flank surface and a lower flank surface. At least the running surface is provided with a vapor-deposited layer such that part of the running surface is provided with a removable cover enabling an essentially sharp-edged running edge to be formed between the running surface and at least one of the flank surfaces, once the vapor-deposited layer has been produced and the cover has been removed.

13 Claims, 2 Drawing Sheets

U.S. PATENT DOCUMENTS

Figure 1:
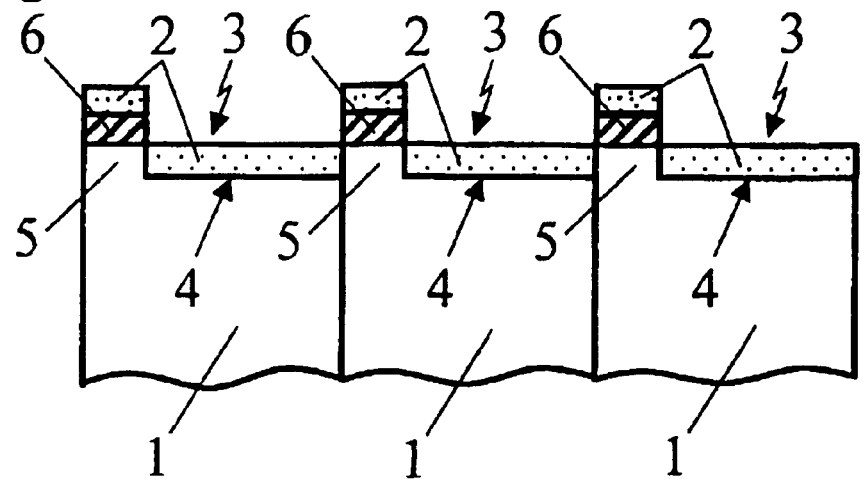

| | | | |
|---|---|---|---|
| 6,139,022 A * | 10/2000 | Iwashita et al. | 277/443 |
| 6,325,385 B1 * | 12/2001 | Iwashita et al. | 277/442 |
| 6,425,364 B1 * | 7/2002 | Craft et al. | 123/193.6 |
| 7,252,292 B2 * | 8/2007 | Panelli et al. | 277/472 |
| 7,267,344 B2 * | 9/2007 | Fischer et al. | 277/443 |
| 2007/0071990 A1 * | 3/2007 | Suman | 428/548 |
| 2007/0218303 A1 * | 9/2007 | Ogawa et al. | 428/472.2 |

FOREIGN PATENT DOCUMENTS

GB      710 950 A      6/1954

* cited by examiner

PISTON RING AND METHOD FOR THE PRODUCTION THEREOF

TECHNICAL FIELD

The invention concerns a piston ring, containing a contact surface supplied with a contact surface profile as well as an upper and a lower side surface.

RELATED ART

In patent EP-B 0 702 097, a sliding member is to be seen in which the surface of a substrate is coated with a compound, which at a minimum contains chromium nitride, in which a column-like crystal structure in a tension fissure surface of the coating is present, wherein the columns are aligned from the substrate surface towards the coating surface. The porosity of the coating should, on the basis of the chromium nitride, lie between 1.5 and 20%, wherein the thickness of the coating is between 1 µm and 80 µm. If required, an intermediate layer, composed of chrome, can be provided in between the base material and the coating. The sliding member can be a piston ring, in which the coating is provided, at least on the peripheral slide surface. The sliding member should be coated either with metal nitride or with metal carbide, where the application can occur either through a PVD (physical vapor deposition) process or a CVD (chemical vapor deposition) process. The composition of the coating consists here of CrN, $Cr_2N$ or a mixture thereof, in a uniform phase. Contact surface coatings, which have been deposited with a PVD or CVD process on the contact surface of the sliding member (piston rings), have very positive effects on their technical operation. A disadvantage is that the PVD coatings do not economically allow grinding processing. Therefore, till now only a piston ring construction that after the coating required no grinding processing could be used.

One of such a design is in all known cases a completely coated contact surface. Because the compound between PVD coating and the base material is under very high stresses, in order to avoid edge breakage, a strongly beveled edge must be used. However, this significantly reduces the capacity of the rings to wipe off oil.

However, it would be desirable to have a ring with a PVD coated contact surface and a sharp lower contact surface edge.

Piston rings with sharply-edged contact surface edges are known for an optimal oil wiping behavior. However, such rings are not realizable with the named state of the art, so that despite the high-grade contact surface coating, the practical scope of application, rather, exists only conditionally.

SUMMARY OF THE INVENTION

The object of the invention is to build on the known state of the art according to EP-B 0 702 097, so that on one hand the complete contact surface does not have to be provided with such a coating, and, on the other hand, an optimal oil wipe-off in operating conditions is guaranteed.

This task is solved by a piston ring containing a contact surface supplied with a contact surface profile as well as an upper and a lower side surface, in which at the minimum, the contact surface is supplied with a vapor deposition coating, in such a way that a portion of the contact surface is supplied with a removable cover, so that after fabrication of the vapor deposition coating and removal of the cover, an essentially sharp-edged contact surface edge exists between the contact surface and at least one of the side surfaces.

Advantageous further developments of the object of the invention are to be seen in the associated representational dependent claims.

The task is also solved by means of a method for the fabrication of a vapor deposition coating on a contact surface of a piston ring supplied with a contact surface profile, in which a base member is provided with a contact surface profile, wherein the base member is supplied with a cover outside of the contact surface profile, the vapor deposition coating is applied on the contact surface and subsequently the cover is removed, so that following the removal of the cover there exists between the contact surface and at least one of the side surfaces of the base member, an essentially sharp-edged contact surface edge.

Advantageous further developments of the method of the invention are to be seen in the associated method according to the dependent claims.

Thus, the proven PVD or CVD process can be further meaningfully used through the object of this invention, and furthermore, the effect of the oil wipe off can also be advantageously improved.

The object of the invention builds upon the base members used in practice, that already are supplied with varying formed contact surface profiles, for example, single or multi-sided chambering, partially conical contact surface areas, grooves or similar. A further advantage of the object of the invention is based in, that depending on the application, the base member can be partially supplied with a galvanized coating that is composed of, for example, chrome. The base member itself can be composed of steel or cast iron.

In analogy to the state of the art according to EP-B 0 702 097, the vapor deposition coating can be produced based on Cr and N, and in a similar means, applied of the contact surface of the base member.

Depending on the case of use, it can be sensible to form the contact surface profile with at least one undercut, so that in the state of operation of the piston ring an oil retaining reservoir is formed between the remaining cross member, or the chamber wall, and the vapor deposition coating.

Likewise it is conceivable, to form the contact surface profile in such a way that a porous transitional area is provided between the remaining cross member, or the chamber wall, and the vapor deposition coating. Conditionally due to the porosity, an area for oil retention could likewise be created.

The removable cover could be of the most varied type, where the person skilled in the art would choose the appropriate cover for the intended case of use, also with regards to economic considerations. The cover can, for example, be a single piece formed out of the material of the base member, and after the application of the vapor deposition coating, it is removed from the base member. A particular advantage is associated with this, in that the otherwise the very hard vapor deposition coating that is not economically grindable, can, through a simple means, be separated, so that, on the one hand, a wear resistant protection layer is created, and, on the other hand, an essentially sharp-edged contact surface edge is created. Likewise, metal or plastic bands are conceivable as covers.

THE DRAWINGS

The object of the invention is illustrated of the basis of the embodiment examples in the drawing and is described in the following.

FIG. 1 is a conceptual representation of a piston ring coating method with a partial cover of the individual piston rings; and FIGS. 2 through 5 illustrate piston rings with varied profiles, on one side with the cover, and on the other side with the cover removed.

DETAILED DESCRIPTION

FIG. 1 shows as the conceptual sketch of several piston rings 1, arranged one after the other, that are supplied with a vapor deposition layer. Each piston ring 1 possesses a contact surface 3 supplied with a contact surface profile 4, here built by a single sided chamber. The remaining cross member 5 is supplied with a removable cover 6. After the cover 6 has been applied, the piston ring packet, formed from the piston rings 1—for example, as set out in EP B 0 702 097 U.S. Pat. No. 5,743,536 whose disclosure is incorporated herein by reference is subjected to a vapor deposition coating, according to the PVD process, created in such a way that a vapor deposition coating 2, in this example consisting of CrN, is created.

Following the coating, the piston rings 1 are separated and the cover 6 removed. If a projection in the area of the cross member 5 remains, this can be processed in an simple form, to achieve—so far as this is desired—a smooth surface with the vapor deposition layer 2. The vapor deposition layer should amount to, in this example, 30 μm.

The FIGS. 2 through 5 show piston rings with varied contact surface profiles 4, in various machined states.

Figure 2A:
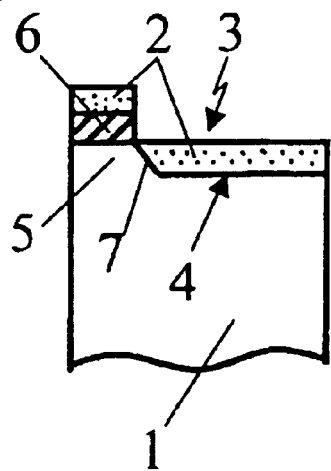
Figure 2B:
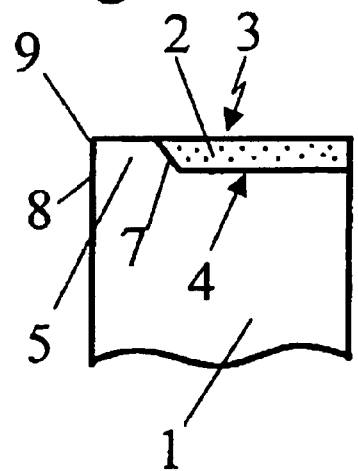

The FIGS. 2a and 2b show a slant 7 that runs under a tilt angle into the contact surface profile 4. The cover 6 is applied on the remaining cross member 5. FIG. 2b shows end state of the piston ring 1, after the cover 6 was removed. It can be recognized that between the contact surface 3, and in this example, the lower side surface 8, an essentially sharp-edged contact surface edge 9 is formed.

Figure 3A:
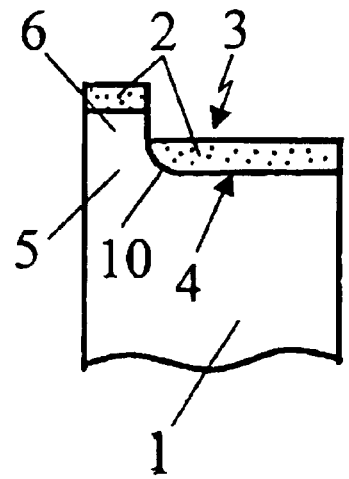
Figure 3B:
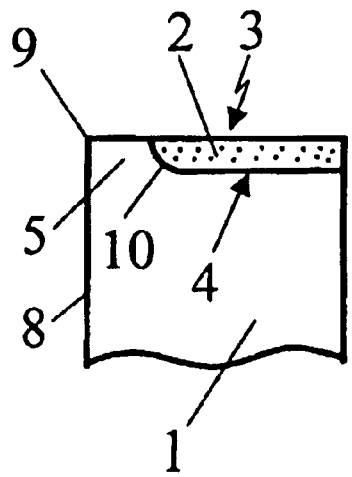

The FIGS. 3a and 3b are to be evaluated in a similar way, in which here a rounded area 10 is given, that runs into the contact surface profile 4 from the cross member 5. The cover 6 is to be, in this example, formed out a single piece of the base material of the piston rings 1. After application of the vapor deposition coating 2, the provided material can, in the area of the cover 6, be ground. If this is not reasonable due to economic considerations, it is possible that the cross member 5 is removed, for example, by turning or milling, until, for example, a level surface is created with the vapor deposition coating 2. The person skilled in the art would choose the particular machining process dependent on the application case. Here also—as shown in FIG. 3b—a sharp contact surface edge 9 is formed after the removal of the cover 6.

Figure 4A:
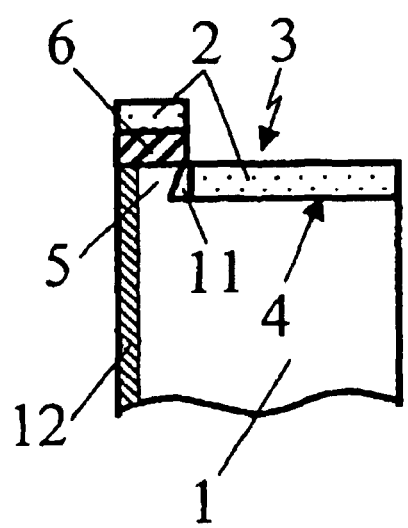
Figure 4B:
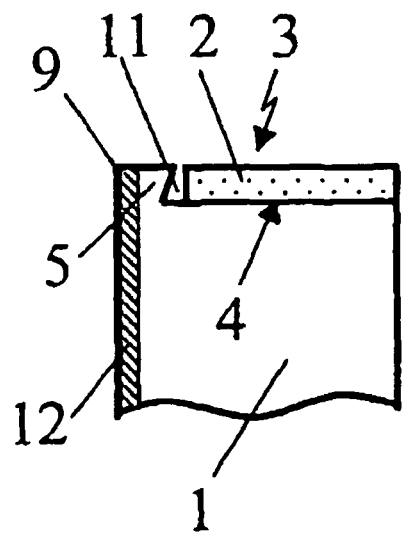

The FIGS. 4a and 4b show a further variation. The piston ring 1, after the application of the vapor deposition coating 2 is partially supplied with a galvanized layer 12, for example, out of chrome. In contrast to FIGS. 2 and 3, the profile 4 is provided in such a way, that undercut areas 11 are formed, into which the vapor deposition material can permeate only partially or not at all. After removal of the cover 6—depending on the angle of inclination—either porous areas are formed here or even chambers, which in the operating state of piston rings 1 serve as oil holding reservoirs.

Figure 5A:
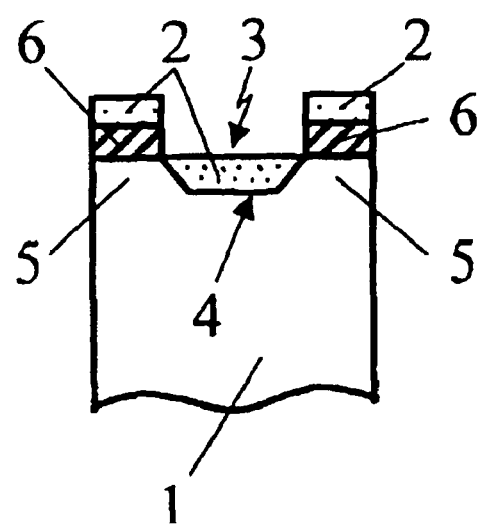
Figure 5B:
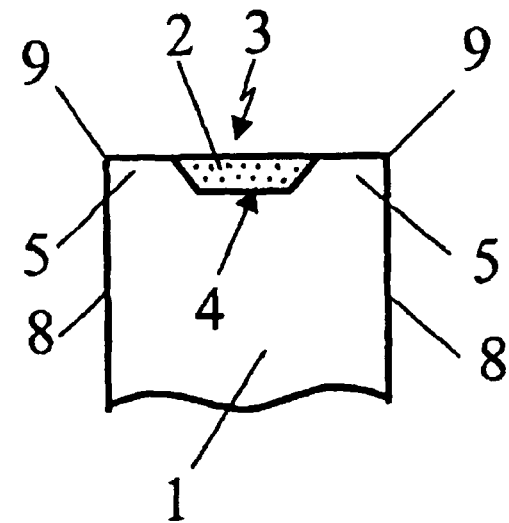

The FIGS. 5a and 5b show another variation of a contact surface profile 4. A groove with supplied slants is illustrated, in which each outer cross member 5 is supplied with a cover 6. After removal of the cover 6—as shown in FIG. 5b—a sharp-edged contact surface edge 9 is formed between the contact surface 3 and the side surface 8.

What is claimed is:

1. A piston ring having an outer annular contact surface extending between opposite side faces of the piston ring, wherein a first portion of said contact surface being made up of a base metal of the piston ring and a remaining second portion of said contact surface being made up of a vapor deposition coating; and further wherein the contact surface merges into each of the side faces at sharp 90° edges that are free of bevels and with the first portion of the contact surface having a machined or ground surface finish and the second vapor deposition coating portion of the contact surface being unmachined or unground and at essentially the same surface level as that of the first portion.

2. The piston ring of claim 1, wherein the vapor deposition coating has a thickness of between 5 and 70 μm.

3. The piston ring of claim 2 wherein said vapor deposition coating comprises Cr-based or N-based coatings.

4. The piston ring of claim 3 wherein said base metal comprises steel or cast iron.

5. The piston ring of claim 4 wherein the remaining second portion of the contact surface extends to the other of the sharp edges.

6. The piston ring of claim 4 wherein the first portion extends to both of said sharp edges with said second portion spaced from said sharp edges.

7. The piston ring of claim 4 including an undercut between said first and second portions of said contact surface spaced from said sharp edges.

8. The piston ring of claim 3 wherein the first portion of the contact surface extends to one of the sharp edges.

9. A method of forming a coated piston ring, comprising:
   forming an annular recess in an outer annular surface of the piston ring extending between opposite side surfaces;
   applying a vapor deposition hard coating to the outer surface of the piston ring to build up a depth of coating material in the recess; and
   following the coating step, selectively machining or grinding the piston ring in only the regions adjacent the recess to expose in said adjacent regions uncoated base piston ring material that is machined or ground to essentially the same surface level as that of the coating material of the recess, and such that the piston ring has two sharp 90° opposite side edges, and wherein at least one of the sharp side edges is formed by the machined or ground piston ring base material.

10. A method, according to claim 9 wherein the vapor deposition coating is formed by a PVD or CVD process.

11. A method, according to claim 9 wherein the base member in the area of at least one of the side surfaces is supplied with a galvanized layer.

12. A method, according to claim 9 wherein the vapor deposition coating is created based on Cr and N, in a layer thickness between 5 and 70 μm.

13. A method, according to claim 9 including forming, under cuts for the creation of a oil-retaining reservoirs.

* * * * *